Figure 1:
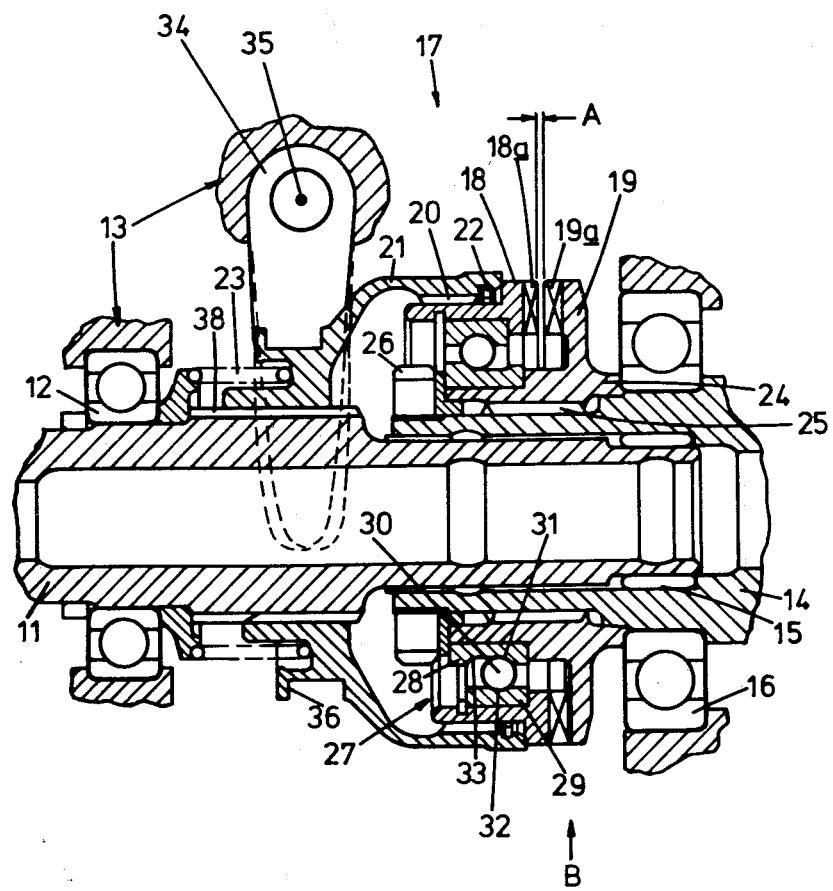

United States Patent [19]

Humphrey

[11] 4,320,633

[45] Mar. 23, 1982

[54] FREEWHEEL COUPLING

[75] Inventor: Geoffrey J. Humphrey, Yeovil, England

[73] Assignee: Westland Aircraft Limited, Yeovil, England

[21] Appl. No.: 104,977

[22] Filed: Dec. 18, 1979

[30] Foreign Application Priority Data

Jan. 10, 1979 [GB] United Kingdom ............... 00931/79

[51] Int. Cl.³ .............................................. F16D 3/00
[52] U.S. Cl. ........................................ 64/25; 64/9 R; 192/46
[58] Field of Search ............... 64/9 R, 24, 25; 192/46, 192/114 R

[56] References Cited

U.S. PATENT DOCUMENTS

| | | | |
|---|---|---|---|
| 1,252,893 | 1/1918 | Ellett | 192/46 |
| 1,763,332 | 1/1930 | Sykes | 64/9 R |
| 2,883,020 | 4/1959 | Kummich et al. | 192/114 R |
| 3,306,409 | 2/1967 | Giometti | 192/46 |
| 3,638,774 | 1/1972 | Burch et al. | 192/46 |

FOREIGN PATENT DOCUMENTS

| | | | |
|---|---|---|---|
| 1041747 | 10/1958 | Fed. Rep. of Germany | 192/46 |
| 416090 | 9/1934 | United Kingdom . | |
| 495857 | 2/1937 | United Kingdom . | |
| 270409 | 8/1970 | U.S.S.R. | 192/46 |

Primary Examiner—P. S. Lall
Attorney, Agent, or Firm—Larson and Taylor

[57] ABSTRACT

A freewheel coupling for drivingly connecting co-axial driving and driven shafts includes preventer means adapted to automatically prevent engagement except when the speed of rotation of the driving and driven shafts is substantially synchronized. The preventer means comprises a ball bearing having a ball race located in circumferential trackways in inner and outer races attached respectively to first and second coupling parts, and having a plurality of slots extending laterally from one of the trackways so as to permit relative axial movement of the coupling parts by movement of the balls of the ball race in the slots.

17 Claims, 3 Drawing Figures

FREEWHEEL COUPLING

This invention relates to freewheel couplings, particularly though not exclusively to such couplings for use in helicopter transmission systems.

Traditionally, freewheel couplings are used in helicopter transmission systems to transmit rotary motion in one direction between a drive shaft from the power source and a driven shaft connected to a rotor system, and to overrun when the speed of rotation of the driven shaft exceeds that of the drive shaft. These couplings usually comprise a plurality of roller bearings located by a cage between inner and outer races, one of which is provided with sloping surfaces equal in number to the number of rollers so that rotation of the drive shaft moves the rollers up the respective sloping surfaces to engage the drive and, during overrunning, the rollers move back down the sloping surfaces to disengage the coupling.

Such couplings rely on area contact between the surfaces of the rollers and the sloping surfaces to provide sufficient friction to transmit the necessary torque, and this consideration dictates the size of the coupling that is usually larger and heavier than is desirable. Furthemore, it will be apparent that the rollers are subjected to centrifugal forces during rotation which can result in very significant loadings especially in high speed applications such as in helicopter transmission systems, and this also requires the coupling to be of substantial size and weight to ensure sufficient strength to withstand the high loads.

In multi-engined helicopters it is usual for the freewheel coupling in the drive from one of the engines to be positively actuatable to a disengaged position. This has been accomplished by means associated with the cage and operative to retain the rollers in a disengaged position to prevent their moving up the sloping surfaces on rotation of the drive shaft. The actuatable freewheel coupling is used during start-up to isolate its respective engine from the rotor so that such engine may drive an accessory gearbox. The rotor is then started by the further engine(s). When the rotor attains its design speed, the engine driving the actuatable freewheel is slowed, the coupling actuated and the engine speed increased so that the engine is engaged to the rotor drive to provide its respective proportion of available power in driving the rotor.

Engagement of the actuatable freewheel is a precise operation that has to be accomplished when desired operational characteristics prevail since otherwise the capacity of the coupling may inadvertently be exceeded when engaging drive, which may result in a failure of the coupling necessitating time consuming and costly repair.

Accordingly, in one aspect, the invention provides a freewheel coupling including drive means adapted to drivingly connect co-axial driving and driven shafts so as to transmit rotation in one direction of rotation and to overrun when the speed of rotation of the driven shaft exceeds that of the driving shaft, and preventer means adapted to prevent engagement of the drive means except when the speed of rotation of the driving and driven shafts is substantially synchronised.

Said preventer means may include a ball bearing having inner and outer races, a ball race comprising a plurality of balls retained in equi-spaced relationship and arranged to run in circumferential trackways formed in facing surfaces of the inner and outer races, and a plurality of equi-spaced slots equal in number to the number of balls and extending laterally from an open end opening into one of the trackways to permit relative axial movement of the inner and outer races by movement of the balls in the slots. Preferably, the slots are disposed at an angle to a centreline of the trackway and are of substantially the same width and depth dimensions as the trackway. In one embodiment the angle may be approximately 28 degrees.

Conveniently, the inner and outer races may be rotationally fixed respectively to radially spaced-apart portions of first and second coupling parts located concentric of an axis of rotation, the coupling parts being rotationally fixed to the driving and driven shafts respectively, one of the parts being capable of axial movement relative its respective shaft.

Preferably, the drive means may comprise interengageable sets of axially facing radially extending clutch teeth formed respectively on the first and second coupling parts. Conveniently, leading edges of the teeth are angled so that said teeth tend to be drawn into full engagement when drive is transmitted from the driving to the driven shaft. The leading edge tooth angle may be approximately 18 degrees.

Trailing edges of the teeth may be angled so as to co-operate, when the speed of rotation of the driven shaft exceeds that of the driving shaft, to urge the teeth sets out of engagement. Preferably, the angled trailing edges are spaced-apart when the said teeth sets are in a fully engaged position. The trailing edge angle may be approximately 31 degrees.

Preferably, spring means are operatively associated with the axially movable coupling part so as to urge the set of teeth of that coupling part into engagement with the teeth of the other coupling part.

Actuating means may be operatively associated with the axially movable coupling part to selectively retain said coupling part in a disengaged position against the force of the spring. Conveniently, said actuating means may comprise a pivotally mounted U-shaped lever straddling the axially movable coupling part, each leg of the lever carrying a roller engaged in a circumferential slot in an external surface of the coupling part.

In another aspect the invention provides a freewheel coupling for connecting co-axial driving and driven shafts and comprising a first coupling part rotationally fixed to one of the shafts and axially slidable relative thereto and a second coupling part rotationally fixed to the other shaft, the coupling parts having interengaging sets of teeth arranged to transmit rotation in one direction and to overrun when the speed of the driven shaft exceeds that of the driving shaft, spring means urging the coupling parts into engagement, one of the coupling parts carrying an inner race of a ball bearing and the other coupling part being supported by an outer race of the ball bearing, a ball race separating the inner and outer races and having a plurality of balls supported by a cage in equi-spaced relationship for rotation in circumferential trackways formed in facing surfaces of the inner and outer races, one of the trackways being provided with equi-spaced slots opening into the trackway and equal in number to the number of balls in the ball race, the slots extending from the trackway so as to permit the other race and its associated coupling part to move axially relative the other coupling part thereby to permit engagement and disengagement of the teeth.

In yet another aspect the invention provides, in or for a helicopter having at least two engines arranged to drive a rotor, a freewheel coupling interconnecting a driving shaft connected to one of the engines and a driven shaft connected to the rotor so as to transmit rotation from the one engine to the rotor in one direction of rotation and to overrun when the speed of the driven shaft exceeds that of the driving shaft, the coupling including preventer means adapted to prevent driving engagement except when the speed of rotation of the driving and driven shafts is substantially synchronised.

Preferably, the preventer means includes a ball bearing having an outer race located in a first coupling part rotationally fixed to one of the driving or driven shafts and axially slidable relative thereto, an inner race located in a second coupling part rotationally fixed to the other shaft and a ball race comprising a plurality of balls supported by a cage in equi-spaced relationship for rotation in circumferential trackways formed in facing surfaces of the inner and outer races, the first and second coupling parts having interengaging sets of axially facing radially extending clutch teeth arranged so as to be disengaged when the ball race is located in the circumferential trackways, spring means urging the teeth into engagement, and a plurality of equi-spaced slots equal in number to the number of balls in the ball race and opening into the trackway in one of the races and extending from the trackway so as to permit the other race and its associated coupling part to move axially relative to other coupling part thereby permitting engagement and disengagement of the teeth.

The coupling preferably includes actuating means selectively operable to retain the coupling parts and associated sets of teeth in a disengaged position against the force of the spring.

Figure 2:
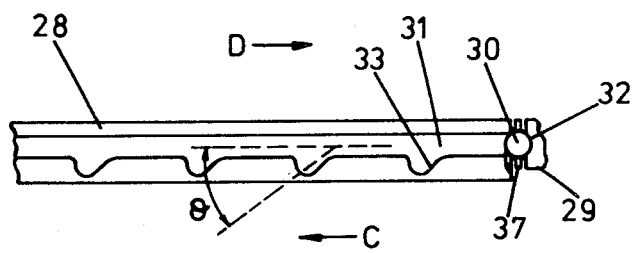
Figure 3:
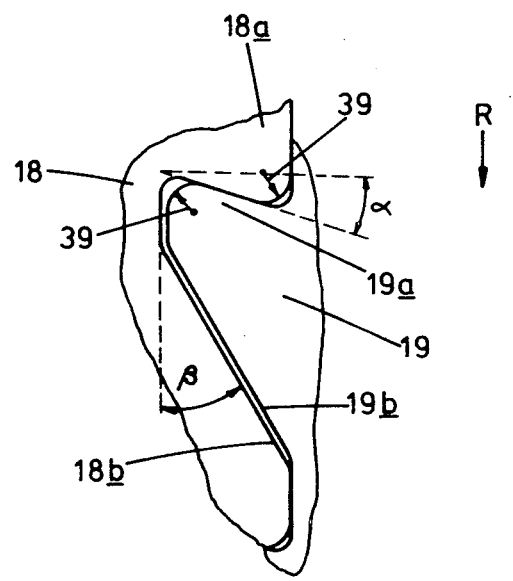

The invention will now be described by way of example only and with reference to the accompanying drawings, in which:

FIG. 1 is a fragmentary sectioned view of a freewheel coupling constructed in accordance with one embodiment of the invention and incorporated in a helicopter transmission system, the coupling being illustrated in a disengaged position in the upper half of FIG. 1 and in an engaged or driving position in the lower half, FIG. 2 is a fragmentary developed view of the inner race of the ball bearing of the coupling of FIG. 1 adjacent the undeveloped view of the ball race and outer race, and FIG. 3 is a fragmentary detail view of part of the coupling of FIG. 1 in the direction of arrow B of FIG. 1.

Referring now to FIG. 1, a driving shaft 11 is supported by a ball bearing 12 in a housing forming part of a helicopter transmission gearbox (generally indicated at 13), and is connected to a power source (not shown) for rotation about its longitudinal axis.

An inner end of the driving shaft 11 is located concentrically within a tubular driven shaft 14 and is supported by a roller bearing 15 so that the shafts 11 and 14 are capable of rotational movement relative each other. The driven shaft 14 is also supported by a ball bearing 16 in the housing 13, and is connected to a helicopter rotor system (not shown).

The driving and driven shafts, 11 and 14 respectively, are interconnected by a freewheel coupling generally indicated at 17, this being arranged to transmit rotational movement from the driving shaft 11 to the driven shaft 14 in one direction only, and to overrun if the speed of rotation of the driven shaft 14 in that direction tends to exceed that of the driving shaft 11.

As previously noted, the upper half of FIG. 1 illustrates the coupling 17 in a disengaged position and the lower half of FIG. 1 illustrates the coupling 17 in an engaged or driving position.

The freewheel coupling 17 includes first and second annular coupling parts 18 and 19, each part being provided with co-engageable complementary sets of axially facing radially extending clutch teeth 18a and 19a respectively.

First coupling part 18 is located on axial splines 20 formed in one end of a housing 21, and is retained by a circlip 22 which permits limited relative axial movement between the coupling part 18 and the housing 21. The other end of the housing 21 is provided with internal axially extending splines located in mating splines 38 formed on the circumference of the driving shaft 11 so as to be axially slidable relative thereto. A spring 23 is supported concentrically of the driving shaft 11 and in engagement with the housing 21 to urge the housing 21 and the first coupling part 18 axially towards the second coupling part 19.

The second coupling part 19 has an annular flange portion 24 located in spaced-apart concentric relationship with an inner surface of the first coupling part 18, and is located on axially extending splines 25 formed on the circumference of the driven shaft 14, being retained by a nut 26 screwed onto the shaft 14.

A ball bearing, generally indicated at 27, is located between the first and second coupling parts 18 and 19 respectively, having an inner race 28 carried by the second coupling part 19 and an outer race 29 supporting the first coupling part 18. A ball race 30 separates the inner and outer races 28 and 29. The ball race 30 runs in circumferential trackways 31 and 32 formed respectively in the inner and outer races, and comprises six balls retained in equi-spaced relationship by a ball cage 37 (FIG. 2).

Six equi-spaced slots 33 (FIGS. 1 and 2) are provided in the inner race 28. The slots 33 extend laterally from an open end opening into the trackway 31 in the inner race 28 at an angle $\sigma$ (FIG. 2) to a centreline of the trackway 31, and are substantially the same width and depth as the trackway 31. In the illustrated embodiment, angle $\sigma$ is 28 degrees.

FIG. 3 is a detail view taken in the direction of arrow B of FIG. 1 and illustrates details of the form of teeth 18a and 19a provided on the first and second coupling parts 18 and 19 respectively, showing the engaged position.

The teeth 18a and 19a each have a leading edge tooth radius 39 of 0.75 mm, and an angle $\alpha$ of 18 degrees to a radial plane containing the axis of rotation. The rear trailing edges of the teeth are provided with corresponding sloping surfaces 18b and 19b respectively, arranged at an angle $\beta$ to a plane perpendicular to the axis of rotation and so as to be spaced-apart when the teeth 18a and 19a are fully engaged as shown in FIG. 3. The angle $\beta$ is 31 degrees.

In the illustrated embodiment, the freewheel coupling of FIG. 1 includes actuating means operative to selectively actuate the coupling 17 between its engaged and disengaged position. A U-shaped lever 34 (FIG. 1) is pivotally mounted to the structure 13 for movement about a lateral axis 35 by an actuating mechanism (not shown) to move the free ends of the lever 34 through a range of movement illustrated by the broken outlines.

The ends of the U-shaped lever 34 are arranged to straddle the housing 21, and carry diametrically opposed rollers (not shown) located in a circumferential slot 36 formed in the housing 21. The actuating mechanism includes means such as a spring box (not shown) to take up movement of the lever 34 tending to urge the coupling 17 into engagement until the operating conditions hereinafter to be described are satisfied.

Operation of the actuatable freewheel coupling 17 of the illustrated embodiment will now be described in relation to its installation and use in the drive from a first engine of a twin-engined helicopter.

Prior to starting the first engine, the actuating lever 34 is rotated clockwise about the axis 35 to retain the housing 21 and the first coupling part 18 in the disengaged position shown in the upper half of FIG. 1 and against the force of the spring 23. In this position, a gap A of 0.5 mm exists between facing surfaces of teeth 18a and 19a. The first engine may therefore be started so as to drive, e.g. an auxiliary gearbox without transmitting torque to the driven shaft 14 and thence to the rotor system.

Starting of the second engine, however, causes rotation of the rotor system that in turn rotates the driven shaft 14. Rotation of the driven shaft 14 causes rotation of the second coupling part 19 through the splines 25, and rotation of the inner race 28 of the ball bearing 27 in the direction of arrow C (FIG. 2). If at this time the first engine is not running to rotate the driving shaft 11, this rotation of the driven shaft 14 results in rotation of the ball race 30 in the same direction and at a lower speed than the inner race 28 but, owing to the position of the actuating lever, the ball race is restrained to rotate in the circumferential trackways 31 and 32, i.e., in the position illustrated in the upper half of FIG. 1.

However, with the first engine running and rotating the driving shaft 11 in the same direction as the driven shaft 14, the housing 21, the first coupling part 18 and the outer race 29 of the bearing 27 are also rotated in the same direction.

This simultaneous rotation of the inner and outer races 28 and 29 in the same direction and at different speeds results in rotation of the ball race 30 in the same direction but at a speed intermediate that of the inner and outer races 28 and 29.

Thus, the speed of rotation of the ball race 30 depends upon the respective speeds of rotation of the inner and outer races 28 and 29 of the bearing 27 and, consequently, on the respective speeds of rotation of the driving and driven shafts 11 and 14, the speed of rotation of the ball race 30 being equal to that of the inner and outer races 28 and 29 when these are rotating at the same speed.

To engage the coupling for transmission of torque from the first engine to the driven shaft 14, the driving and driven shafts 11 and 14 are caused to rotate in the same direction, with the driven shaft 14 powered by the rotor system rotating faster than the driving shaft 11, and the actuating lever 34 is rotated counter-clockwise about the axis 35. Whilst the speed of rotation of the inner race 28 of the bearing 27 exceeds that of the ball race 30 by more than a predetermined amount, the slots 33 in the inner race 28 are driven continually past the balls of the ball race 30, thereby retaining the ball race 30 in the circumferential trackway 31 to retain the teeth 18a and 19a out of engagement and against the force of the spring 23. In this condition the movement of the lever 34 is taken up by the spring box (not shown) and no change takes place in the coupling 17.

The speed of the driving shaft 11, and consequently the outer race 29, is the gradually increased, causing a corresponding increase in the speed of rotation of the ball race 30. As the speed of the ball race 30 approaches that of the inner race 28, the balls move more slowly past the open ends of slots 33 in the direction of arrow D (FIG. 2) and tend to drop into the slots 33 under the influence of the spring 23. However, whilst an overrun condition exists (i.e., the inner race 28 is still rotating faster than the outer race 29) engagement of the coupling 17 is prevented by inter-engagement of the trailing sloping surfaces 18b and 19b (FIG. 3) that will push the balls of the ball race 30 back into the trackway 31. The direction of the slots 33 and the angles $\sigma$ (28°) and $\beta$ (31°) are so inter-related that the balls in the ball race 30 move smoothly back into the trackway 31 without jamming in the slots 33.

As the speed of the ball race 30 increases to be nearer that of the inner race 28, the balls are able to move progressively further into the slots 33 before being returned to the trackway 31 until, when the speed of the ball race 30 synchronises with that of the inner race 28, the movement is such as to permit meshing of the teeth 18a and 19a by an amount corresponding to the gap A plus the tooth radius 39, whereafter the reaction between the teeth as a result of the tooth angle $\alpha$ serves to pull the first coupling part 18 towards the second coupling part 19 until the teeth are fully engaged. In this condition the driving shaft 11 drives the driven shaft 14 in the direction of the arrow R (FIG. 3), and the first engine is connected to provide its proportion of the torque required to drive the rotor system.

It will be apparent that the balls of the ball race 30 have now moved to the ends of the slots 33, as illustrated in the lower half of FIG. 1, and remain in that position all the time that drive is being transmitted through the coupling 17. The length of the slots 33 is, therefore, equivalent to an amount necessary to take up movement required for initial engagement of the teeth (i.e. $2 \times$ radius $39 + A = 2 \times 0.75$ mm $+ 0.5$ mm $= 2.0$ mm) plus a dimension sufficient to enable the teeth 18a to move into full engagement with teeth 19a.

The tooth angle $\alpha$ (18 degrees in the illustrated embodiment) is calculated to provide sufficient reaction force to overcome friction between the splines 38 on the driving shaft 11 and the housing 21.

If, during operation, the speed of rotation of the driven shaft 14 tends to exceed that of the driving shaft 11, either by an increase in the speed of the driven shaft or a reduction in the speed of the driving shaft, the sloping surfaces 18b and 19b come into contact to automatically separate the teeth 18a and 19a to disengage the coupling 17. This causes axial movement of the outer race 29 of the bearing 27 resulting in movement of the balls of the ball race 30 back into the trackway 31. The corresponding relative increase in the speed of rotation of the inner race 28 causes the open ends of the slots 33 to be driven past the balls of the ball race 30, so that the ball race 30 is automatically retained in the trackway 31 to retain the coupling 17 in the disengaged position.

Re-engagement of the coupling 17 from an overrun condition caused by a reduction in the speed of the driving shaft is similar to that previously described for initial engagement of the coupling. In the case of an overrun condition caused by an increase in the speed of the driven shaft, the desired relative speed relationship between the inner race 28 and the ball race 30 is achieved automatically on a reduction in the speed of the driven shaft 14.

It will be understood that the invention also extends to a non-actuatable coupling that is similar to the coupling previously described but does not include the actuating lever 34 and attendant operating mechanism. Such a coupling could be installed in the drive from the second engine in a twin-engined helicopter installation.

Operation of such a non-actuatable coupling is similar to that previously described in the overrun condition in that re-engagement is prevented automatically until such time as the relative rotational speed of the inner race 28 and the ball race 30 are synchronised so as to permit engagement under the influence of spring 23. If during engine start-up, the non-actuatable coupling is in a disengaged position, initial rotation of the driving shaft 11 ensures that the ball race 30 moves into the slots 33 under the influence of the spring 23 so as to effect immediate engagement of the coupling.

Thus, the present invention provides a freewheel coupling incorporating positive drive means and in which engagement of co-axial driving and driven shafts is automatically prevented until the speed of the shafts is synchronised.

Engagement and disengagement of the driving teeth is accomplished by the slots 33 in the ball bearing 27 which permit relative axial movement of the inner and outer races 28 and 29 respectively and, therefore, the coupling parts 18 and 19 carried thereby, engagement being permitted only when the speed of rotation of the ball race 30 is substantially the same as that of the inner race 28 with which the slots 33 are associated, which occurs only when the speed of rotation of the inner and outer races 28 and 29 are, or are nearly, synchronised.

The positive drive provided by the engageable teeth, and the elimination of the troublesome loads caused by centrifugal forces active on the rollers of some prior couplings ensures that the size and weight of a coupling according to this invention can be minimised for any particular application. This is of particular importance in an aircraft environment where small size and low weight are prime design considerations. Furthermore the present coupling automatically prevents the inadvertent application of overload in an actuatable coupling, thereby resulting in smoother drive engagement, longer life and reduced maintenance costs.

In a practical installation, the housing 13 preferably surrounds the coupling 17 and carries suitable means to provide lubrication of the coupling 17 and the ball bearing 27. Although the invention has been described in relation to its installation in a helicopter transmission system, it will be understood that the coupling will find application in many other areas in which similar facilities are required.

The operating speed of the coupling of this invention will of course depend on its particular application: for example, in one application in a helicopter transmission system, the design operating speed is 12,890 r.p.m. Similarly the relative speed of the driving and driven shafts at which the balls commence to move into and out of the slots prior to full engagement of the teeth at synchronous speed will depend on detail design features such as friction in the mating splines, the relative angles of the teeth and the slots, and the strength of the spring. However, in the aforementioned application, the coupling is designed so that this tendency of the balls to move into the slots occurs only when the speed difference between the driving and driven shafts is less than about 2.5 percent, and, to ensure efficient operation and minimise wear in the coupling, it is considered that this range will not normally exceed about 3.0 percent.

Whilst one embodiment has been described and illustrated it will be understood that modifications can be made without departing from the scope of the invention as defined in the appended claims. For instance, the interengaging teeth 18a and 19a may be of other suitable forms. The slots 33 may be provided in the outer race 29 of the bearing 27 instead of in the inner race 28.

I claim as my invention:

1. A freewheel coupling including drive means adapted to drivingly connect co-axial driving and driven shafts so as to transmit rotation in one direction of rotation and to overrun when the speed of rotation of the driven shaft exceeds that of the driving shaft, and preventer means adapted to prevent engagement of the drive means except when the speed of rotation of said driving and driven shafts is substantially synchronized wherein said preventer means includes a ball bearing having inner and outer races, a ball race comprising a plurality of balls retained in equi-spaced relationship and arranged to run in circumferential trackways formed in facing surfaces of said inner and outer races, and a plurality of equi-spaced slots equal in number to the number of balls and extending laterally from an open end opening into one of said trackways to permit relative axial movement of the inner and outer races by movement of the balls in said slots.

2. A coupling as claimed in claim 1, wherein said slots are disposed at an angle to a centreline of said trackway and are of substantially the same width and depth dimensions as said trackway.

3. A coupling as claimed in claim 2 wherein said angle is approximately 28 degrees.

4. A coupling as claimed in claim 1, wherein said inner and outer races are rotationally fixed respectively to radially spaced-apart portions of first and second coupling parts located concentric of an axis of rotation, said coupling parts being rotationally fixed to said driving and driven shafts respectively, one of said parts being capable of axial movement relative its respective shaft.

5. A coupling as claimed in claim 4, wherein said drive means comprises interengageable sets of axially facing radially extending clutch teeth formed respectively on said first and second coupling parts.

6. A coupling as claimed in claim 5, including spring means operatively associated with said axially movable coupling part to urge the set of teeth of that coupling part into engagement with the teeth of the other coupling part.

7. A coupling as claimed in claim 6, including actuating means operatively associated with said axially movable coupling part to selectively retain said coupling part in a disengaged position against the force of said spring.

8. A coupling as claimed in claim 7, wherein said actuating means comprise a pivotally mounted U-shaped lever straddling said axially movable coupling part, each leg of said lever carrying a roller engaged in a circumferential slot in an external surface of said coupling part.

9. A coupling as claimed in claim 5, wherein leading edges of said teeth are angled so that said teeth tend to be drawn into full engagement when drive is transmitted from the driving to the driven shaft.

10. A coupling as claimed in claim 9, wherein said leading edge tooth angle is approximately 18 degrees.

11. A coupling as claimed in claim 5, wherein trailing edges of said teeth are angled so as to co-operate when the speed of rotation of the driven shaft exceeds that of the driving shaft, to urge the teeth sets out of engagement.

12. A coupling as claimed in claim 11, wherein said angled trailing edges are spaced-apart when said teeth sets are in a fully engaged position.

13. A coupling as claimed in claim 11, wherein said trailing edge angle is approximately 31 degrees.

14. A coupling as claimed in claim 1, wherein driving engagement is permitted only when relative speeds of rotation of said driving and driven shafts are within three percent.

15. A freewheel coupling for connecting co-axial driving and driven shafts and comprising a first coupling part rotationally fixed to one of said shafts and axially slidable relative thereto and a second coupling part rotationally fixed to the other shaft, the coupling parts having interengaging sets of teeth arranged to transmit rotation in one direction and to overrun when the speed of the driven shaft exceeds that of the driving shaft, spring means urging said coupling parts into engagement, one of said coupling parts carrying an inner race of a ball bearing and the other coupling part being supported by an outer race of the ball bearing, a ball race separating said inner and outer races and having a plurality of balls supported by a cage in equi-spaced relationship for rotation in circumferential trackways formed in facing surfaces of said inner and outer races, one of said trackways being provided with equi-spaced slots opening into the trackway and equal in number to the number of balls in said ball race, said slots extending from said trackway so as to permit the other race and its associated coupling part to move axially relative the other coupling part thereby to permit engagement and disengagement of the teeth.

16. In or for a helicopter having at least two engines arranged to drive a rotor, a freewheel coupling interconnecting a driving shaft connected to one of said engines and a driven shaft connected to the rotor so as to transmit rotation from said one engine to said rotor in one direction of rotation and to overrun when the speed of rotation of said driven shaft exceeds that of said driving shaft, said coupling including preventer means adapted to prevent driving engagement except when the speed of rotation of said driving and driven shafts is substantially synchronized wherein said preventer means includes a ball bearing having an outer race located in a first coupling part rotationally fixed to one of said driving or driven shafts and axially slidable relative thereto, an inner race located in a second coupling part rotationally fixed to the other shaft and a ball race comprising a plurality of balls supported by a cage in equi-spaced relationship for rotation in circumferential trackways formed in facing surfaces of said inner and outer races, said first and second coupling parts having interengaging sets of axially facing radially extending clutch teeth arranged so as to be disengaged when said ball race is located in said circumferential trackways, spring means urging said teeth into engagement, and a plurality of equi-spaced slots equal in number to the number of balls in said ball race and opening into the trackway in one of said races and extending from said trackway so as to permit the other race and its associated coupling part to move axially relative to the other coupling part thereby to permit engagement and disengagement of said teeth.

17. A coupling as claimed in claim 16 and including actuating means selectively operable to retain said coupling parts and associated sets of teeth in a disengaged position against the force of the spring.

* * * * *